United States Patent
Pridmore et al.

(10) Patent No.: US 9,450,907 B2
(45) Date of Patent: Sep. 20, 2016

(54) BUNDLED EVENT MEMORIES

(71) Applicant: FACEBOOK, INC., Menlo Park, CA (US)

(72) Inventors: Keenan Pridmore, Chicago, IL (US); Philip John MacGregor, IV, Chicago, IL (US)

(73) Assignee: FACEBOOK, INC., Menlo Park, CA (US)

( * ) Notice: Subject to any disclaimer, the term of this patent is extended or adjusted under 35 U.S.C. 154(b) by 267 days.

(21) Appl. No.: 13/804,423

(22) Filed: Mar. 14, 2013

(65) Prior Publication Data

US 2014/0280537 A1    Sep. 18, 2014

(51) Int. Cl.
H04L 12/58     (2006.01)
G06F 17/30     (2006.01)
G06Q 50/00     (2012.01)
G06Q 10/10     (2012.01)
H04L 29/06     (2006.01)

(52) U.S. Cl.
CPC ......... *H04L 51/32* (2013.01); *G06F 17/30011* (2013.01); *G06F 17/3053* (2013.01); *G06F 17/30811* (2013.01); *G06F 17/30864* (2013.01); *G06Q 50/01* (2013.01); *G06Q 10/10* (2013.01); *H04L 29/06* (2013.01)

(58) Field of Classification Search
None
See application file for complete search history.

(56) References Cited

U.S. PATENT DOCUMENTS

| | | | |
|---|---|---|---|
| 7,982,738 B2 * | 7/2011 | Jojic | G06F 17/30811 345/473 |
| 2005/0165726 A1 * | 7/2005 | Kawell | H04L 29/06 |
| 2010/0293105 A1 * | 11/2010 | Blinn | G06Q 10/10 705/319 |
| 2012/0005224 A1 * | 1/2012 | Ahrens et al. | 707/769 |
| 2012/0151383 A1 * | 6/2012 | Kazan et al. | 715/753 |
| 2012/0323909 A1 * | 12/2012 | Behforooz | G06F 17/3053 707/728 |
| 2013/0006882 A1 * | 1/2013 | Galliani | 705/319 |
| 2013/0124504 A1 * | 5/2013 | Haugen et al. | 707/722 |
| 2013/0132194 A1 * | 5/2013 | Rajaram | 705/14.52 |
| 2013/0151728 A1 * | 6/2013 | Currier | H04N 21/242 709/248 |
| 2013/0173531 A1 * | 7/2013 | Rinearson | G06F 17/30011 707/608 |
| 2013/0179200 A1 * | 7/2013 | Legard et al. | 705/5 |
| 2013/0226926 A1 * | 8/2013 | Beaurepaire | 707/740 |
| 2013/0332479 A1 * | 12/2013 | Liu | G06F 17/30864 707/769 |
| 2014/0006400 A1 * | 1/2014 | Bastide et al. | 707/737 |
| 2014/0012926 A1 * | 1/2014 | Narayanan et al. | 709/206 |
| 2014/0214964 A1 * | 7/2014 | Liyanage | H04L 51/32 709/205 |
| 2014/0372904 A1 * | 12/2014 | Liu et al. | 715/753 |

\* cited by examiner

*Primary Examiner* — Ranodhi Serrao
*Assistant Examiner* — James Fiorillo
(74) *Attorney, Agent, or Firm* — Nicholson De Vos Webster & Elliott LLP

(57) ABSTRACT

A method for bundling event memories in a social networking system. The method includes identifying a first plurality of user-submitted content items posted to the social networking system that are related to an event involving a plurality of users. The social networking system aggregates the first plurality of user-submitted content items into a bundled event memory, and transmits the bundled event memory to at least some of a plurality of user devices to be presented to at least some of the plurality of users, wherein the plurality of users utilize the plurality of user devices to communicate with the social networking system.

21 Claims, 9 Drawing Sheets

BUNDLED EVENT MEMORIES

FIELD

Embodiments of the invention relate to social networking; and more specifically, to the bundling of event memories in a social networking system.

BACKGROUND

In recent years, the amount of multimedia content posted online has increased dramatically. This increase has further accelerated with the widespread adoption of mobile phones and tablet computers featuring integrated, high-quality still and video cameras. Armed with these portable devices, users are easily able to document and share any aspect of their lives at any moment from nearly any location.

However, this increase in availability of multimedia content has led to an overwhelming and often unorganized accumulation of these digital remnants. This problem, in part, has been the result of the difficulty and significant time required of users to organize this multimedia content by moving it into folder hierarchies and/or assigning tags and labels to these digital files.

Further, with this abundance of digital multimedia content, it has become difficult for users to locate and combine multimedia content from one or more sources into an engaging and portable format allowing for easy sharing with friends and family.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Detailed below are embodiments of methods, systems, and apparatuses for the bundling of event memories in a social networking system. Bundled event memories, in certain of the following embodiments, may be generated from user-submitted content posted to a social networking system or to a third party website or application by one or more users. This user-submitted content may be automatically identified by the social networking system as pertaining to an event, or identified using a set of identifiers provided by a user of the social networking system. The identified user-submitted content (such as but not limited to text, images, audio, and videos) may be aggregated into a multimedia object. In an embodiment, the multimedia object is a video, which may also include an audio soundtrack, but in other embodiments the multimedia object can be any type of multimedia object, such as but not limited to an image, document, audio clip, or executable application. The bundled event memory may then be posted to the social network or provided to users of the social network. Events may be relatively short in time (such as a party or game) or longer in time (such as a baby's first year of life or a season for a professional or college sports team).

Figure 1:
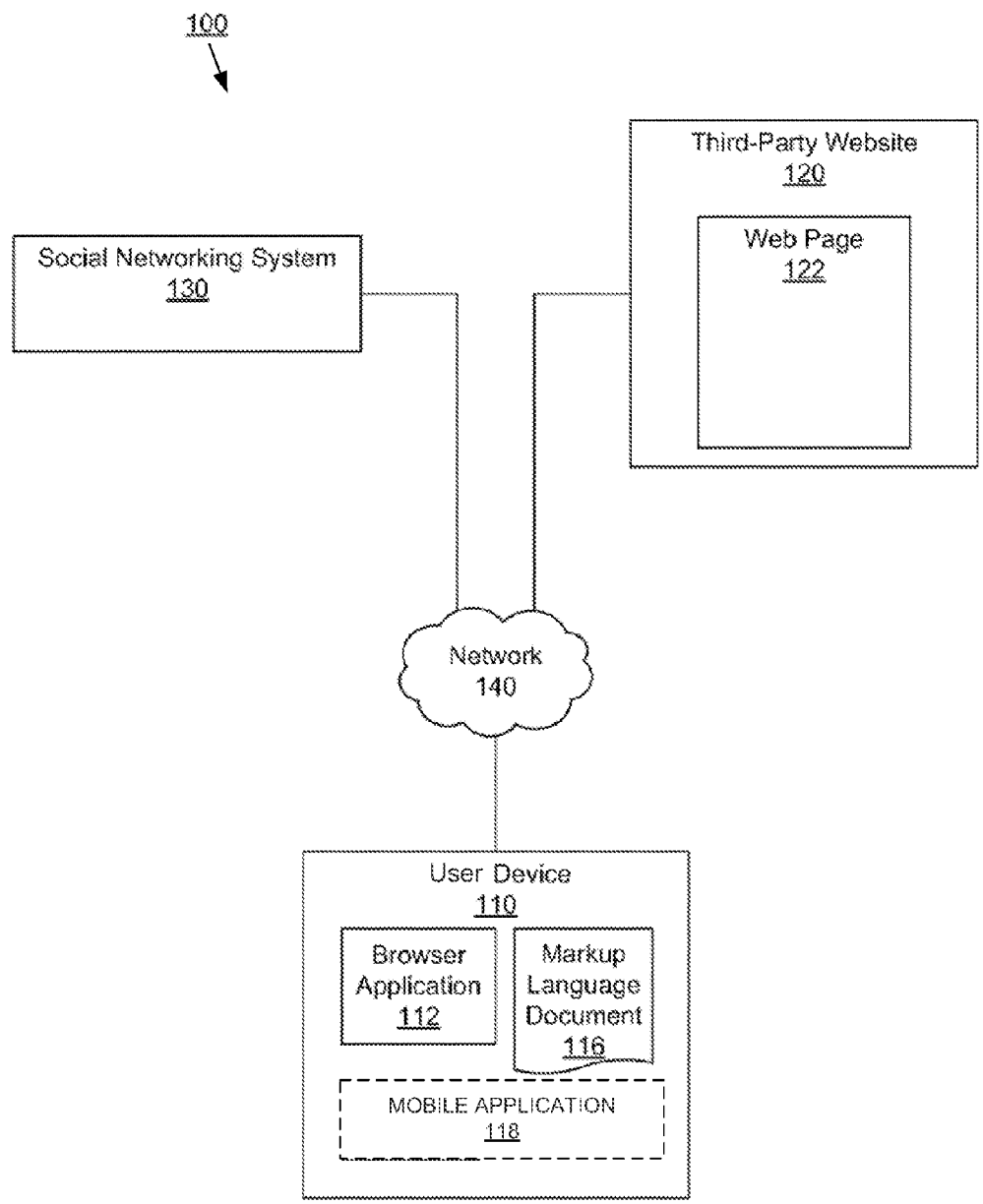
FIG. 1 is a network diagram of one embodiment of a system for providing personalized content to a user of a social networking system.

FIG. 1 is a network diagram of one embodiment of a system 100 for providing personalized content to a user of a social networking system 130. The system 100 includes one or more user devices 110, one or more third-party websites 120, the social networking system 130 and a network 140. For purposes of illustration, the embodiment of the system 100 shown by FIG. 1 includes a single third-party website 120 and a single user device 110. However, in other embodiments, the system 100 may include more user devices 110 and/or more third-party websites 120. In certain embodiments, the social networking system 130 is operated by the social network provider, whereas the third-party websites 120 are separate from the social networking system 130 in that they may be operated by different entities. In various embodiments, however, the social networking system 130 and the third-party websites 120 operate in conjunction to provide social networking services to users of the social networking system 130. In this sense, the social networking system 130 provides a platform, or backbone, which other systems, such as third-party websites 120, may use to provide social networking services and functionalities to users across the Internet.

The user device 110 comprises one or more computing devices that can receive input from a user and can transmit and receive data via the network 140. For example, the user device 110 may be a desktop computer, a laptop computer, a smart phone, a personal digital assistant (PDA), or any other device including computing functionality and data communication capabilities. The user device 110 is configured to communicate with the third-party website 120 and the social networking system 130 via the network 140, which may comprise any combination of local area networks (LANs) and/or wide area networks (WANs), using both wired and wireless communication systems.

In one embodiment, the user device 110 displays content from the third-party website 120 or from the social networking system 130 by processing a markup language document 116 received from the third-party website 120 or from the social networking system 130 using a browser application 112. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page having multiple frames that include text and/or image data retrieved from the third-party website 120 and/or the social networking system 130. In various embodiments, the markup language document 116 comprises a data file including extensible markup language (XML) data, extensible hypertext markup language (XHTML) data or other markup language data.

In one embodiment where the user device 110 is a mobile device such as a smart phone or tablet, the user device 110 also includes one or more mobile applications 118 that execute on the user device 110. The mobile application 118 may execute as an independent stand-alone application or may utilize the network 140 to exchange data between the user device 110, the social networking system 130 and/or the third-party website 120.

The third-party website 120 comprises one or more web servers including one or more web pages 122, which are communicated to the user device 110 using the network 140. The third-party website 120 is separate from the social networking system 130. For example, the third-party website 120 is associated with a first domain while the social networking website is associated with a separate social networking domain. A web page 122 included in the third-party website 120 comprises a markup language document identifying content and including instructions specifying formatting or presentation of the identified content, as described above. The social networking system 130 comprises one or more computing devices storing a social network, or mapping of a social graph, comprising a plurality of users and providing users of the social network with the ability to communicate and interact with other users of the social network. The social networking system 130 is further described below in conjunction with FIG. 2. In use, users of the social networking system 130 add connections to a number of other users of the social networking system 130 to whom they desire to be connected. As used herein, the term "friend" or the term "a connection" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user," "friend" and "connection" depend on the frame of reference. Connections between users of the social networking system 130 are usually bilateral, or "mutual," but connections may also be unilateral, or "one-way." For example, if Bob and Joe are both users of the social networking system 130 and are connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in a third-party website 120, separate from the social networking system 130, coupled to the social networking system 130 via a network 140.

The social networking system 130 is also capable of connecting a variety of entities. For example, the social networking system 130 enables users to interact with each other as well as third-party websites 120 or other entities through an API or other communication channels.

The social networking system 130 also includes user-submitted content, which enhances a user's interactions with the social networking system 130. User-submitted content may include anything a user can add, upload, send, or "post," to the social networking system 130. For example, a user communicates posts to the social networking system 130 from a user device 110. Posts may include data such as status updates or other textual data, location information, photos, videos, links, music or other similar data, content and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 130.

Figure 2:
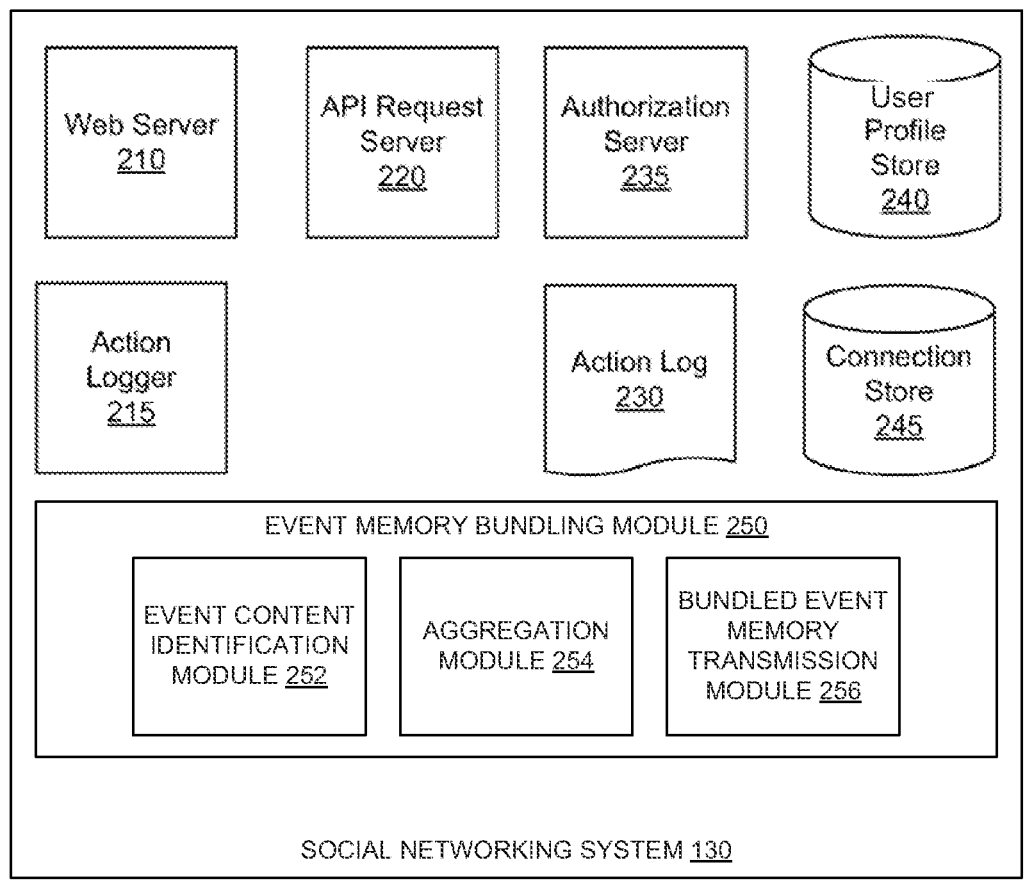
FIG. 2 is a diagram of one embodiment of a social networking system.

FIG. 2 is a diagram of one embodiment of a social networking system 130. The embodiment of a social networking website 130 shown by FIG. 2 includes a web server 210, an action logger 215, an API request server 220, an action log 230, a user profile store 240, a connection store 245, and an event memory bundling module 250. The event memory bundling module 250 includes an event content identification module 252, an aggregation module 252, and a bundled event memory transmission module 252. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network. The user profiles include biographic, demographic, and other types of descriptive information, such as work experience, educational history, hobbies or preferences, interests, location, and the like. The social networking system 130 further stores data describing one or more connections between different users in the connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system to one or more user device 110 and/or one or more third-party websites 130 via the network 240. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and Short Message Service (SMS) messages, or any other suitable messaging format.

The Application Programming Interface (API) request server 220 allows one or more third-party websites 120 and/or mobile applications 118 to access information from the social networking system 130 by calling one or more APIs. The API request server 220 may also allow third-party websites 120 and/or mobile applications 118 to send information to social networking website by calling APIs. For example, a third-party website 120 sends an API request to the social networking system 130 via the network 140 and the API request server 220 receives the API request. The API request server 220 processes the request by calling an API associated with the API request to generate an appropriate response, which the API request server 220 communicates to the third-party website 120 via the network 140. For example, responsive to an API request, the API request server 220 collects data associated with a user and communicates the collected data to the third-party website 120.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 240. In one embodiment, the social networking system maintains the action log 230 as a database of entries. When an action is taken within the social networking system 130, an entry for the action is added to the action log 230.

Additionally, user actions may be associated with an entity outside of the core social networking system 130, such as a third-party website 120 that is separate from the social networking system website 130. For example, the action logger 215 receives data describing a user's interaction with a third party website 120 from the web server 210. Examples of actions where a user interacts with a third-party website 120 includes a user expressing an interest in a third-party website 120 or another entity, a user posting a comment to the social networking system 130 that discusses a third-party website 120, or a web page 122 within the third-party website 120, a user posting to the social networking system 130 a Uniform Resource Locator (URL) or other identifier associated with a third-party website 120, a user attending an event associated with a third-party website 120 or any other action by a user that is related to a third-party website 120. Thus, the action log 240 may include actions describing interactions between a social networking system user and a third-party website 120 that is separate from the social networking system 130.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, mobile applications 118, third-party websites 120 or any entity that can potentially access the information. The information that can be shared by a user comprises user profile information like profile photo, phone numbers associated with the user, user's connections, actions taken by the user such as adding a connection, changing user profile information and the like.

The authorization server 235 contains logic to determine if certain information associated with a user can be accessed by a user's friends, third-party websites 120 and/or other applications and entities. For example, a third-party website 120 that attempts to access a user's comment about a URL associated with the third-party website 120 must get authorization from the authorization server 235 to access the user's work phone number. Based on the user's privacy settings, the authorization server 235 determines if another user, a third-party website 120, a mobile application 118 or another entity is allowed to access information associated with the user, including information about actions taken by the user. For example, the authorization server 235 uses a user's privacy setting to determine if the user's comment about a URL associated with the third-party website 120 can be accessed by the third-party website 120. This enables a user's privacy setting to specify which other users, or other entities, are allowed to receive data about the user's actions or other data associated with the user.

Additionally, the social networking system 130 maintains data about objects with which a user may interact with using the social networking system 130. To maintain this data, the user profile store 240 and the connection store 245 store instances of the corresponding type of objects maintained by the social networking system 130. Each object type has information fields that are suitable for storing information appropriate to the type of object. For example, the user profile store 240 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

The connection store 245 includes data structures suitable for describing a user's connections to other users, connections to third-party websites 120 or connections to other entities. The connection stores 245 may also associate a connection type with a user's connections, which may be used in conjunction with the user's privacy setting, further described above, to regulate access to information about the user.

Embodiments of the social networking system 130 include an event memory bundling module 250 to enable the creation of bundled event memories using user-submitted content posted to the social networking system 130 or to a third party website or application. According to embodiments of the invention, a user identifies an event that has occurred or is occurring, identifies a set of users as event participants, and identifies an event timeframe and an event location. The event can be nearly anything that occurs in life, and in some embodiments the event includes a plurality of users of the social networking system 130 as participants and/or spectators (direct or indirect). For example, an event could be a sporting event (such as a football game, basketball game, hockey game, soccer game, baseball game, etc.) or a set of sporting events (such as a tournament, the Olympics, the Super Bowl, the World Series, the playoffs in any sport, the World Cup, the NCAA Basketball Tournament, etc.). Alternatively, the event could be a social event such as a wedding, group gathering, reunion, party/celebration, gathering at a restaurant or tavern, graduation, conference, presentation, debate, political protest or gathering, farmer's market, flash mob, heritage festival, etc. The event could be an artistic or arts-related event such as a musical performance, art gallery show, poetry or literature reading, festival, etc. The event may also be a natural event, such as a sunset, eclipse, thunderstorm, blizzard, etc. Accordingly, the type of event that can be utilized for bundling of event memories is nearly limitless.

Based upon this event information from the user, the event content identification module 252 of the event memory bundling module 250 identifies user-submitted content posted to the social networking system 130 regarding the event. The identified user-submitted content may include photographs, text (e.g., comments, post messages), videos, audio recordings, illustrations, animations, or any other multimedia or audio-visual content submitted to the social networking system 130, referenced within content submitted to the social networking system 130, or submitted to a third party website or application. In an embodiment where the user-submitted content is submitted to a third party website or application, the event content identification module 252 retrieves the user-submitted content from the third party website or application and stores the user-submitted content within the social networking system 130. As noted above, an event may be relatively short in time or longer in time. As an example of content referenced within other content, a user may post a message to a social networking system 130 including a link or reference to another piece of content. Further, the identified user-submitted content may have been posted by that user, by friends or users connected to that user, or by other users of the social networking system 130 that posted content identified as relating to the event. The user-submitted content may be generated by that submitting user (e.g., a photograph taken by that user, text written by that user), generated by another user (e.g., a post message of a second user that is republished by that user), or generated by another source (e.g., a quotation taken from a book or website of another, a photograph taken by another, etc.)

The event content identification module 252, in some embodiments, also presents the identified user-submitted content to the user to seek input from the user that indicates which of the user-submitted content items are of interest to the user. In embodiments of the invention, this presentation is causing the content to be displayed to the user as part of a webpage or causing the content to be displayed as part of a standalone application executing on a user device of the user. The event content identification module 252, in these embodiments, receives an indication from the user device of the user that identifies which of the identified user-submitted content items are to be used (or not to be used) when creating a bundled event memory. In some embodiments, content is filtered prior to being provided to the user based upon one or more of: geolocation information of the content from geotagging, post text, identified persons or entities in a picture, a date and/or time when the content was created, modified, or posted, a location (other than from geotagging), etc.

The event memory bundling module 250 also includes an aggregation module 254 to take the identified user-submitted content items and aggregate them into a bundled event memory according to user privacy preferences. In an embodiment of the invention, the bundled event memory is a movie (or slideshow), and in some embodiments the movie includes one or more music or audio pieces that play along with images and text. In some embodiments, all audio or visual items within the movie are from the user-submitted content; in other embodiments, one or more of the audio or visual items used in the movie are not from the user-submitted content, and may or may not be selected by the user. For example, the movie may include an audio soundtrack that is not from the user-submitted content and is instead selected by the user. In embodiments of the invention, the movie is encoded using the H.264/MPEG-4 Part 10 video compression standard, the VC-1/SMPTE 421M standard, the On2 TrueMotion VP6 codec, VP8 format, Theora format, WebM format, or other format. The movie may be presented as an Adobe Flash video, a Flash Video, an Ogg video, an HTML5 video, or any other commonly used container format known to those of ordinary skill in the art.

Having aggregated the identified user-submitted content to create a bundled event memory with the aggregation module 254, the bundled event memory transmission module 256 transmits the bundled event memory to one or more user devices of the social networking system 130 for display to the corresponding one or more users. In embodiments of the invention, the bundled event memory is transmitted and displayed to just the user, in other embodiments, the bundled event memory is transmitted and displayed to the user and one or more of the user's friends. Alternatively, the bundled event memory is transmitted to one or more of the user, the user's friends, users that posted any of the user-submitted content aggregated within the bundled event memory, or users that indicated an interest or affiliation with the event.

In addition to creating a bundled event memory based upon event information provided by a user, the event content identification module 252 is also able to automatically detect potential events based upon an analysis of posted user-submitted content. In particular, in some embodiments, the event content identification module 252 is configured to detect patterns of activity within the user-submitted content. For example, a pattern may include a plurality of posts by one or more users referencing those one or users within a period of time, or a plurality of posts from a plurality of users including a similar set of words that are identified as relating to a particular event. The event content identification module 252 may be configured to utilize a number of well-known machine learning techniques to identify such clusters of posts that may indicate an event or whether a post relates to an event.

In performing these and other tasks, the event content identification module 252 may utilize a wide variety of information from the user-submitted content ranging from timestamps from photographs, detected user and object identities from within user-submitted photographs/videos/audio recordings, geolocation information from the posts and objects submitted within posts, metadata from user-submitted content items (e.g. Exchangeable Image File Format (EXIF) metadata, Extensible Metadata Platform (XMP) metadata, International Press Telecommunications Council (IPTC) metadata, etc.), user "check-ins" at a particular location, keywords or codes within a post message that identify another object/topic/user (e.g., a hashtag metadata tag), objects/topics/users that are "tagged" by users within user-submitted content. However, the use of this information and user-submitted content is subject to the privacy policy of the social networking system 130 and also any individual privacy policy implemented by a user of the social networking system 130. For example, if a user of a particular social networking system 130 has set a privacy setting indicating that some or all of their user-submitted content is not to be used in one or more of these ways, the social networking system 130 should abide.

Figure 3:
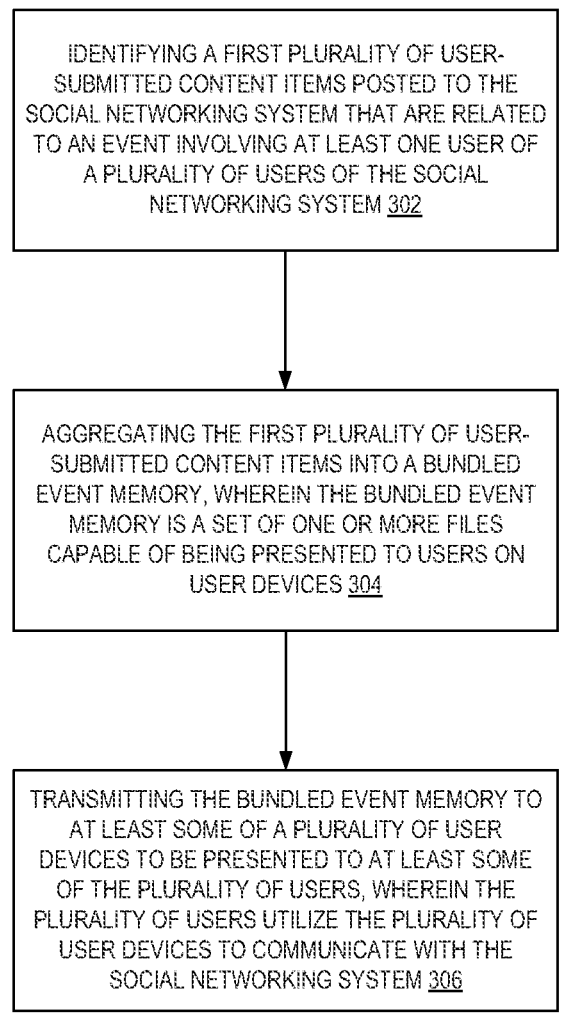
FIG. 3 is a flow diagram illustrating a process for bundling of event memories according to an embodiment of the invention.

FIG. 3 is a flow diagram illustrating a high-level process for the bundling of event memories 300 according to an embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

At 302, the event memory bundling module 250, via the event content identification module 252, identifies a first plurality of user-submitted content items posted to the social networking system that are related to an event that occurred involving one or more users of the social networking system. Several possible ways to perform this identification are discussed later herein with respect to FIG. 4.

Next, at 304 the event memory bundling module 250, via the aggregation module 254, aggregates the first plurality of user-submitted content items into a bundled event memory. This bundled event memory is a set of one or more files capable of being presented to users on user devices. Then, at 306 the event memory bundling module 250, via the bundled even memory transmission module 256, transmits the bundled event memory to at least some of a plurality of user devices to be presented to at least some of the plurality of users, wherein the plurality of users utilize the plurality of user devices to communicate with the social networking system.

Figure 4:
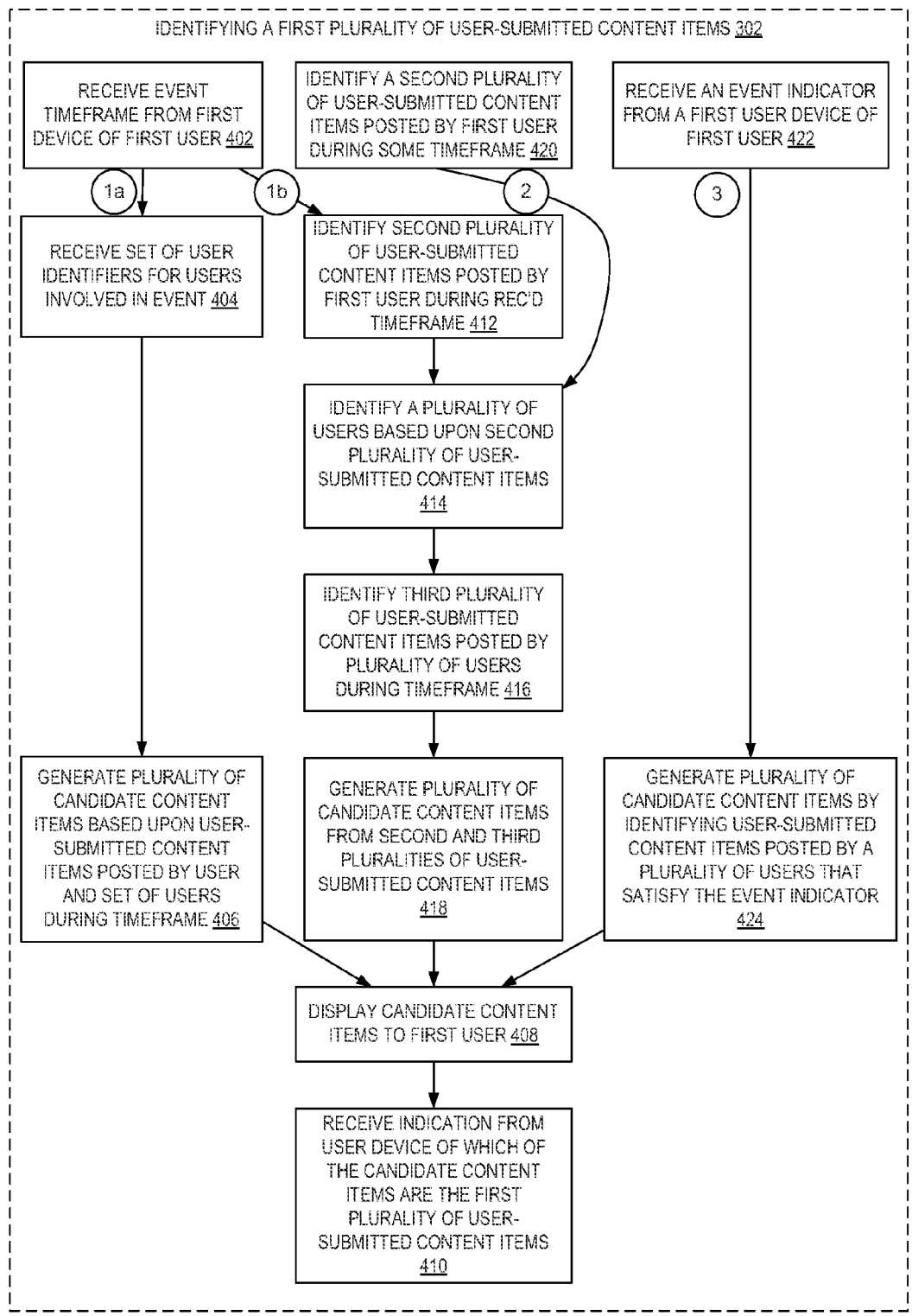
FIG. 4 is a flow diagram illustrating the identification of a first plurality of user-submitted content items of FIG. 3 according to an embodiment of the invention.

FIG. 4 is a flow diagram illustrating the identification of a first plurality of user-submitted content items 302 of FIG. 3 according to an embodiment of the invention. A first approach (illustrated by circle '1a') and second approach (illustrated by circle '1b') begin with the event content identification module 252 receiving an event timeframe from the first device utilized by the first user 402. This timeframe may be a single date or single time that is an approximate time of the event. Alternatively, the timeframe may be a range of dates or times, or both an approximate starting time and an approximate ending time.

In certain embodiments following the first approach (circle '1a'), the event content identification module 252 receives a set of user identifiers for users of the social networking system 130 involved in the event 404. In an embodiment, the set of user identifiers is received from the first device of the first user. In this context, "involved in the event" means that the users either participated in the event, attended the event, observed the event, or discussed the event.

With the set of user identifiers, the event content identification module 252 generates a plurality of candidate content items based upon user-submitted content items posted by the first user and the set of users at or during the received timeframe 406. In an embodiment, event content identification module 252 gathers all content posted to the social networking system 130 by each of the users during the timeframe to generate the plurality of candidate content items according to their privacy preference. In some embodiments, this gathering is further refined by only gathering content posted by the set of users during the timeframe that is in some way determined to likely be associated with the event. As one example, if a piece of content posted by one of the set of users during the timeframe was geo-tagged as having been originated from a same location as the event, this content may be determined to be likely associated with the event, whereas a piece of content posted by another of the set of users during the timeframe may be determined as not being associated with the event if it was geo-tagged with a location far away from the location of the event. In addition to the use of geo-tagged locations, the event content identification module 252 may utilize many other pieces of information from or about content submitted to the social networking system 130 when determining if the content is likely associated with the event, such as metadata of the content, particular words utilized within text of a post, or the identities of users or other entities identified or referenced within the content.

This plurality of candidate content items is displayed to the first user 408, who will indicate which of the plurality of candidate content items should or should not be included within the bundled event memory. Accordingly, the event content identification module 252 receives an indication from the user device of which of the candidate content items have been selected as the first plurality of user-submitted content items 410.

In other embodiments, the event content identification module 252 may be configured to follow circle '1b' after receiving the event timeframe from the first device of the first user 402. At 412, the event content identification module 252 identifies a second plurality of user-submitted content items that were posted by the first user during the received timeframe 412. In some embodiments, the second plurality of user-submitted content items include all content items posted to the social networking system 130 by the first user during the received timeframe, but in other embodiments the second plurality of user-submitted content items includes a subset of all of that posted content, depending upon how likely a particular content item is related to the event, as determined by the event content identification module 252.

At 414, the event content identification module 252 identifies a plurality of users based upon the identified second plurality of user-submitted content items. In embodiments of the invention, the event content identification module 252 examines the second plurality of user-submitted content items to identify one or more of: users that were tagged within a picture/video/message, users that commented on a post, users that "liked" a post, users that republished a post, or users that were determined to be in a picture or video by identification software or hardware.

With the plurality of identified users, the event content identification module 252 identifies a third plurality of user-submitted content items posted by the plurality of users during the timeframe 416. Similar to the identification of the second plurality of user-submitted content items 412, in some embodiments, the third plurality of user-submitted content items include all content items posted to the social networking system 130 by the set of users during the timeframe, but in other embodiments the third plurality of user-submitted content items includes a subset of all of that posted content, depending upon how likely a particular content item is related to the event, as determined by the event content identification module 252.

At 418, the event content identification module 252 generates the plurality of candidate content items from the second and third pluralities of user-submitted content items 418. The generated plurality of candidate content items may include all of the user-submitted content items from the second and third pluralities of user-submitted content items, or it may contain a subset of each of the second and third pluralities of user-submitted content items, or it may contain only some content items from the second plurality or only some content items from the third plurality. At this point, the path indicated by circle '1b' merges with the path of circle '1a', so the event content identification module 252 similarly displays the candidate content items to the first user 408 and receives an indication from the user device of the first user of which of the candidate content items are the first plurality of user-submitted content items to be included in the bundled event memory 410.

Another embodiment for identifying the first plurality of user-submitted content items 302 is illustrated by circle '2' and includes identifying a second plurality of user-submitted content items posted by the first user during some timeframe 420. In an embodiment, this timeframe is not an input to the event content identification module 252, but is an output after the event content identification module 252 has detected a set of one or more user-submitted content items posted by a first user within a particular time frame that appear to relate to a particular event. As described above, the event content identification module 252 may be configured to utilize many different methods to detect posts that are similarly referencing a common event. As one example, the event content identification module 252 may identify such a second plurality of user-submitted content items if a user posts a particular number of posts within a particular amount of time that include/reference to a particular number of common people at a particular location or set of locations. For example, if a user posts 15 different pictures over the span of three hours from Lambeau Field (a football stadium in Green Bay, Wis.) that all include pictures of his/her friends at a "Packers" v. "Bears" game, the event content identification module 252 may detect that these posts all pertain to a common event—a football game where the Packers team beat the Bears team. With this identified second plurality of user-submitted content items posted the first user, the process of circle '2' merges with the process of circle '1b' at 414, where a plurality of users are identified based upon the second plurality of user-submitted content items. Subsequently, the process continues with blocks 416, 418, 408, and 410.

Another embodiment depicted by circle '3' includes receiving an event indicator from a first user device of a first user 422. In an embodiment, the event indicator is a word or string of text (such as a hashtag) that will occur in user-submitted content items that relate to a particular event. In other embodiments, the event indicator is a particular combination of users that, when found together in user-submitted content items, indicate that these content items pertain to a common event. In other embodiments, the event indicator may be a portion of text, a "check-in" location, or any other expression that can be used to test a content item and yield a "yes" or "no" based upon the properties of that content item.

With the received event indicator, the event content identification module 252 generates a plurality of candidate content items by identifying user-submitted content items posted by a plurality of users that satisfy the event indicator 424. In some embodiments, the plurality of users includes the first user and one or more of the "friends" of the first user. In other embodiments, the plurality of users includes one or more users of the social networking system 130 that are not "friends" with the first user. This process of circle '3' then displays the candidate content items to the first user 408, and receives an indication from the user device of the first user of which of the candidate content items are the first plurality of user-submitted content items to be included in the bundled event memory 410.

Figure 5:
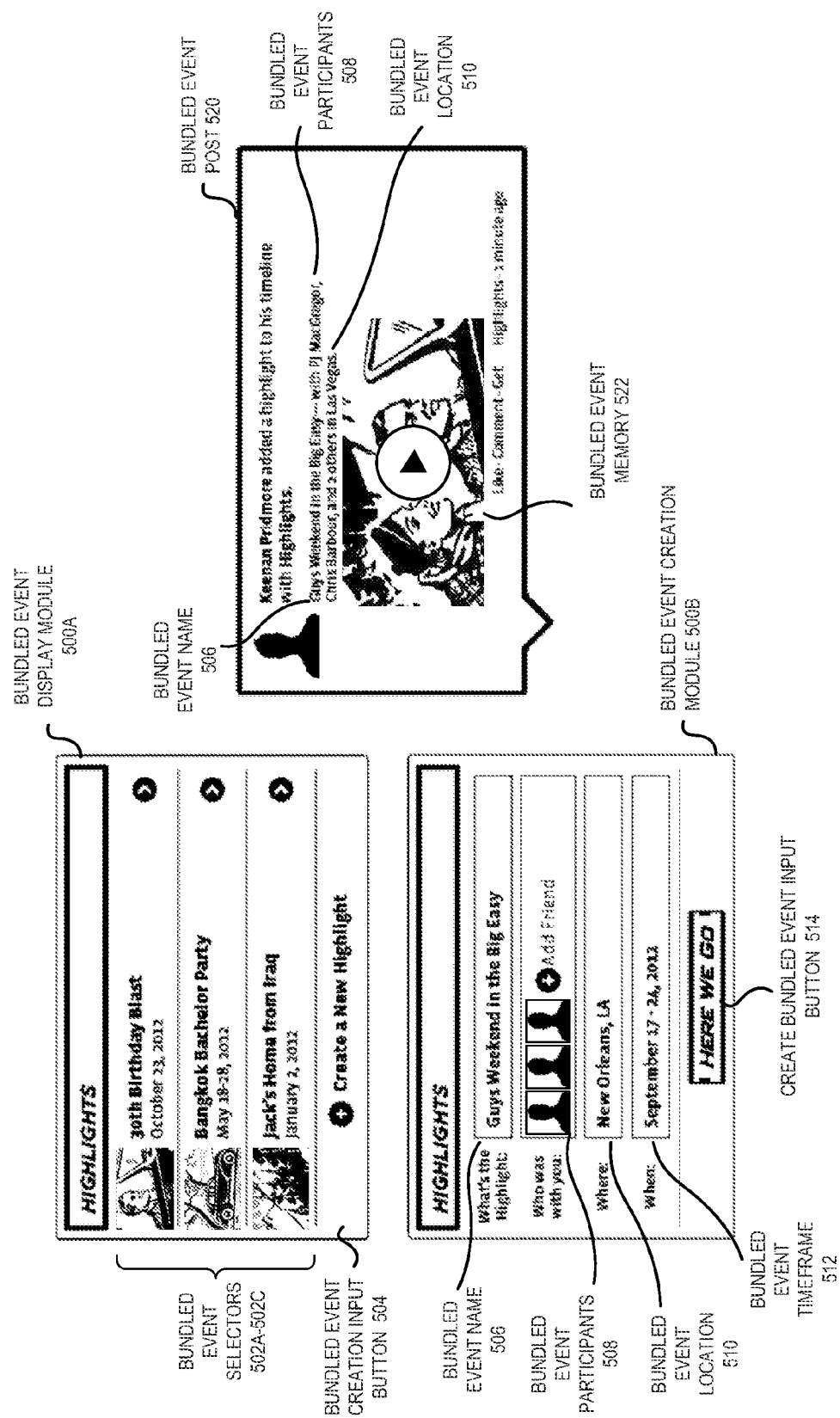
FIG. 5 illustrates user interface elements utilized for creating and displaying bundled event memories according to an embodiment of the invention.

FIG. 5 illustrates user interface elements utilized for creating and displaying bundled event memories according to an embodiment of the invention. In some embodiments, these user interface elements are displayed as a portion of a web page served by web server 210, and in some embodiments these interface elements are displayed as a portion of a standalone application such as mobile application 118.

The bundled event display module 500A is a user interface element that allows a user to view any of a set of previously created bundled memories or create a new bundled event memory. The first three elements of the bundled event display module 500A are bundled event selectors 502A-502C. Each bundled event selector (e.g. 502A) contains a thumbnail of a bundled event memory, a bundled event name (e.g. "30th Birthday Blast"), and a bundled event timeframe (e.g. "Oct. 23, 2012"). Upon a user selecting one of the bundled event selectors 502A-502C, the associated bundled event memory is displayed to the user. The bundled event display module 500A also includes a bundled event creation input button 504, which upon user selection, allows the user to create a new bundled event memory. In one embodiment, when a user selects the bundled event creation input button 504, the bundled event creation module 500B is displayed.

The bundled event creation module 500B includes a number of input fields allowing a user to utilize the event memory bundling module 250 to create a bundled event memory. The bundled event creation module 500B includes a bundled event name 506 input, which allows a user to provide a description of the event. The bundled event creation module 500B also includes a bundled event participants field 508, which allows a user to enter some users of the social networking system 130 that were involved in the event, and further includes a bundled event location 510 to allow the user to input a geographic location of the event. As depicted, the bundled event timeframe 512 allows the user to input a range of dates for the event, but in other embodiments the bundled event timeframe allows the user to enter one date, several dates (consecutive or non-consecutive), a date range, several date ranges (consecutive or non-consecutive), one time, a time range, or several time ranges. Finally, the bundled event creation module 500B includes a create bundled event input button 514 allowing the user to submit the request to create a bundled event memory. In an embodiment of the invention, upon a user filling out these inputs, the event memory bundling module 250 performs at least some of the steps of FIG. 3 and FIG. 4 to create the bundled event memory, which might require further input from the user via other user interface elements that are not displayed herein.

Figure 6:
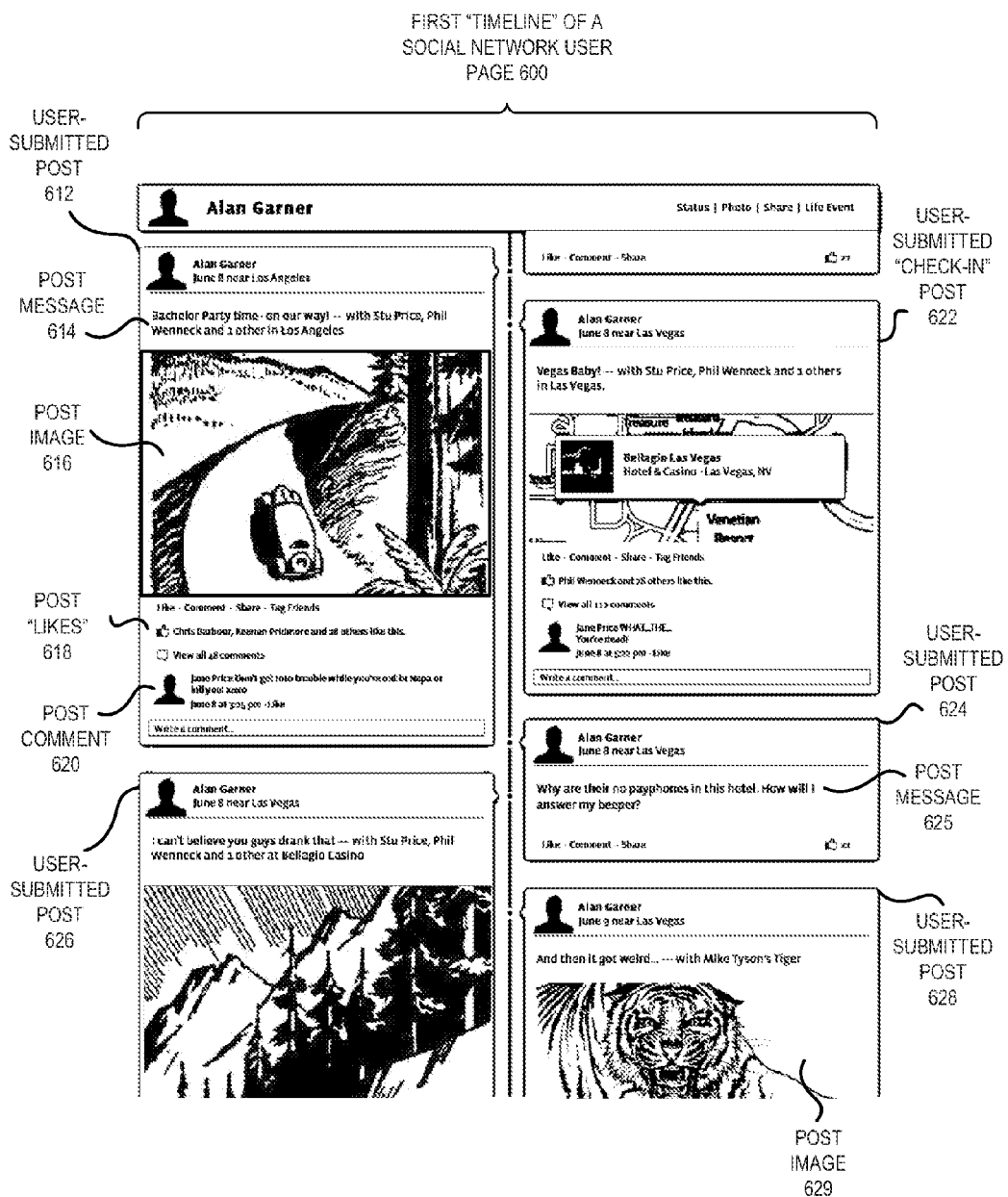
FIG. 6 illustrates a first timeline social network user page including user-submitted content items according to an embodiment of the invention.
Figure 7:
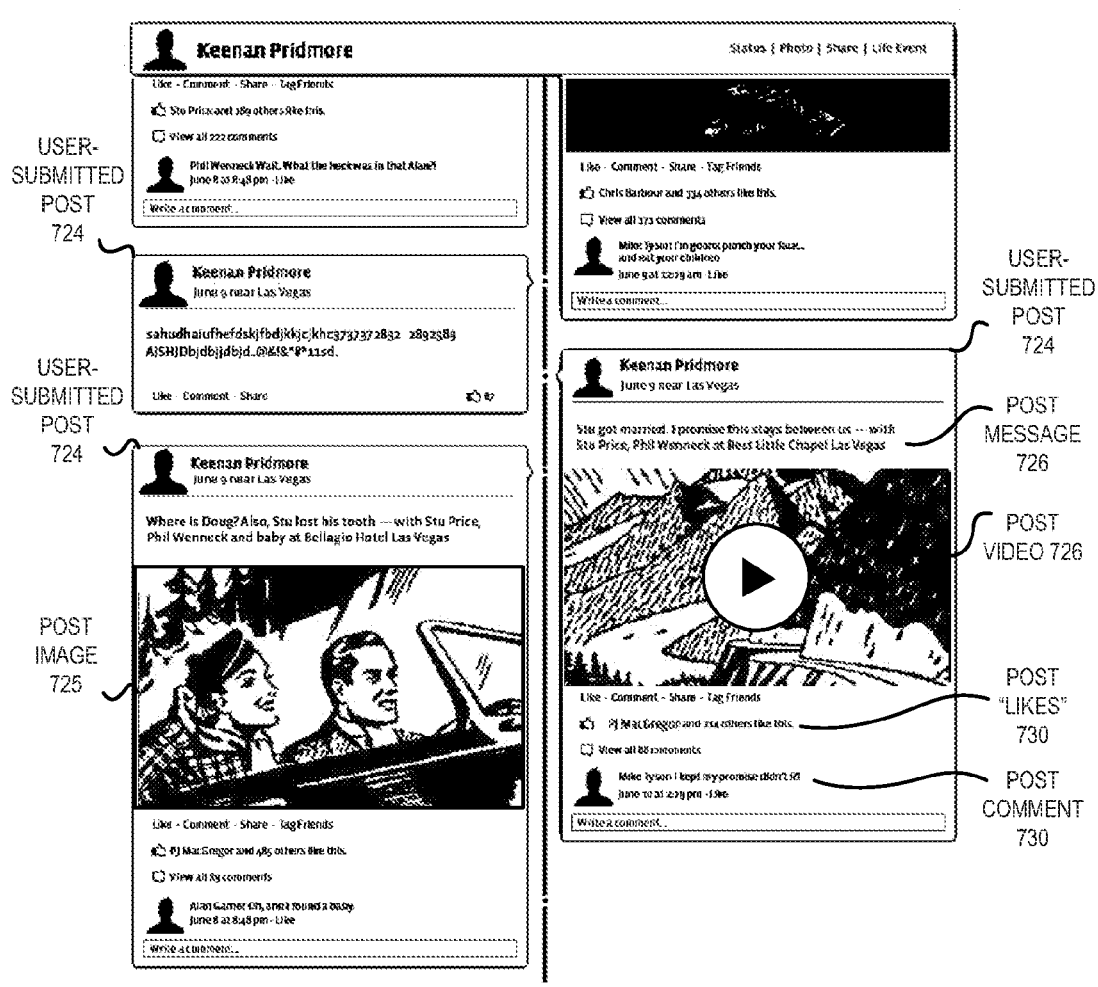
FIG. 7 illustrates a second timeline social network user page including user-submitted content items according to an embodiment of the invention.

Upon creation of a bundled event memory, the bundled event post 520 (or similar) user interface may be posted to a page associated with the user (such as a timeline of a social network user page as illustrated in FIG. 6 or FIG. 7), pages associated with the entered bundled event participants 508, or pages associated with a plurality of users of the social networking system 130. The bundled event post 520 includes a bundled event memory 522, along with the bundled event name 506, the bundled event participants 508, and the bundled event location 510. In embodiments of the invention, the user can select and play the bundled event memory 522 within the bundled event post 520 user interface element; in other embodiments, the user may select the bundled event memory 522 video in the bundled event post 520 user interface yet play the bundled event memory 522 video in a separate interface or using a separate standalone media player application (such as VLC by VideoLAN, iTunes by Apple Inc., RealPlayer by Real Networks, or Windows Media Player by Microsoft). In some embodiments, the bundled event memory 522 is directly downloadable by the user.

FIG. 6 illustrates a first timeline social network user page 600 including user-submitted content items according to an embodiment of the invention, and FIG. 7 illustrates a second timeline social network user page 700 including user-submitted content items according to an embodiment of the invention. In embodiments of the invention where user-submitted content items are gathered from a plurality of users, the timelines of social network user pages (600, 700) of FIG. 6 and FIG. 7 are helpful for understanding aspects of the invention. Each of these timelines of social network user pages (600, 700) includes a plurality of user-submitted posts including user-submitted content items.

The first timeline of a social network user page 600, for a user named "Alan Gamer", includes a user-submitted post 612 comprising a post message 614 of text, a post image 616, an indication of post "likes" 618 (i.e. an indication of other users of the social networking system 130 that approve of the user-submitted post 612), and at least one post comment 620 of text. The page also includes two other user-submitted posts (612, 628) that include post messages and post images (e.g. 629). Further, this page also includes a user-submitted "check-in" post 622, which similarly includes a post message 614 of text, an indication of post "likes", and at least one post comment, but further includes a map and description of the geographic location where the user created the user-submitted "check-in" post 622 from. The page also includes a user-submitted post 624 that is essentially just a post message 625, and does not include a post image or "check-in" location.

Turning to FIG. 7, the second timeline of a social network user page 700, which is for a user named "Keenan Pridmore", includes a user-submitted post 724 with a post message, a user-submitted post 724 with a post message and post image 725. The second timeline social network user page 700 also includes a user-submitted post 724 including a post message 726, a post video 726, an indication of post "likes" 730, and at least one post comment 730 of text.

Figure 8:
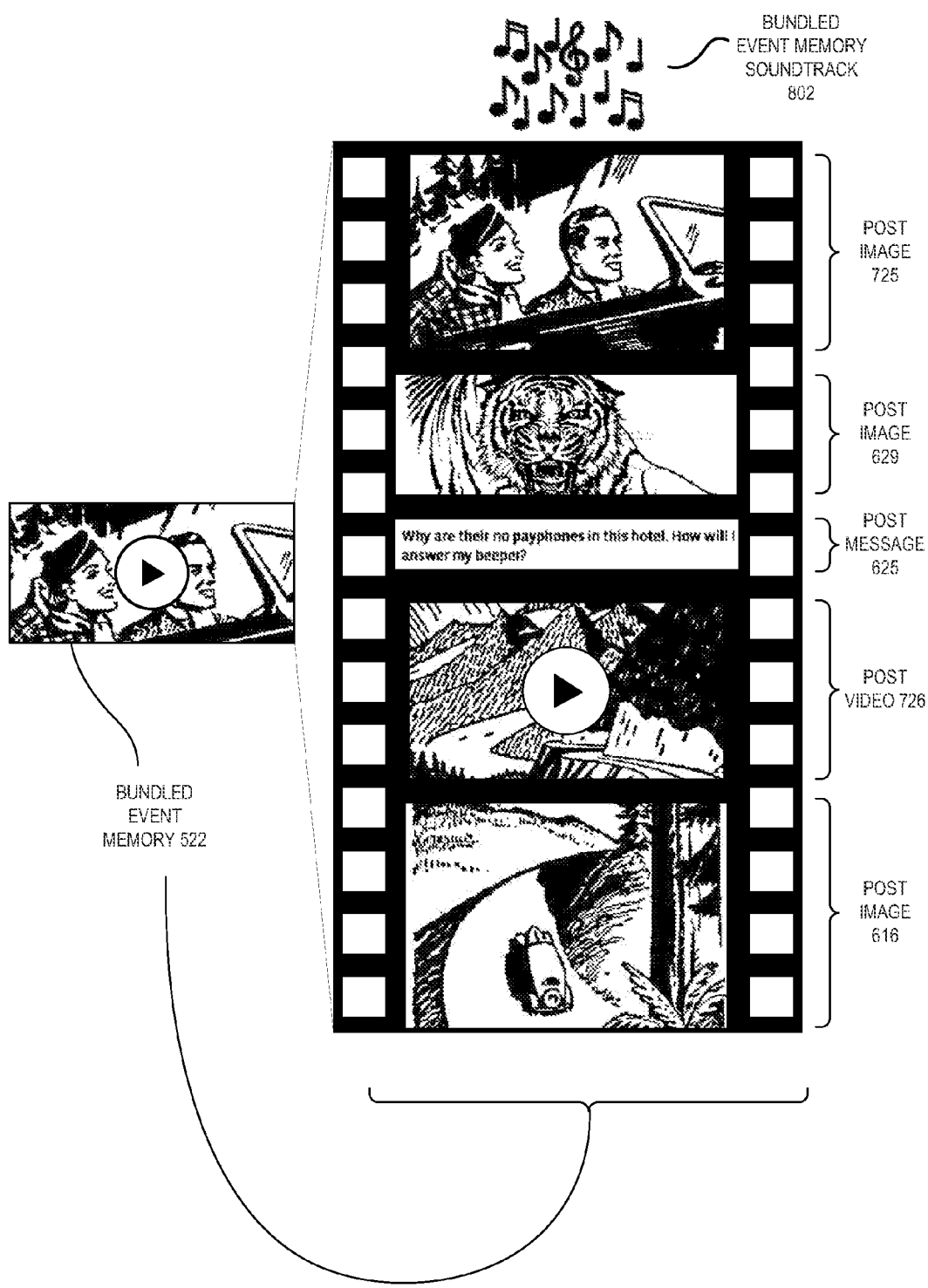
FIG. 8 illustrates a bundled event video including user-submitted content from the first and second timeline social network user pages of FIG. 6 and FIG. 7 according to an embodiment of the invention.

FIG. 8 illustrates a bundled event video including user-submitted content from the first and second timeline social network user pages of FIG. 6 and FIG. 7 (or, "first user page" and "second user page") according to an embodiment of the invention. The bundled event memory 522 (earlier depicted with respect to FIG. 5) on the left side of FIG. 8 is expanded on the right side of FIG. 8 to illustrate the concept of bundled event memories. This bundled event memory, which is a video, includes at least five user-submitted content items of three different content types (i.e. image, text, video) from two users. The bundled event memory 522 includes three different content items of type "image": a post image 725 from the second user page 700, a post image 629 from the first user page 600, and a post image 616 from the first user page 600. Second, the bundled event memory 522 includes one user-submitted content item of type "text": the post message 625 from the first user page 600. Third, the bundled event memory 522 includes one user-submitted content item of type "video": the post video 726 of the second user page 700. In embodiments of the invention, the bundled even memory (e.g. 522) may include more or few content types, more or fewer user-submitted content items, and/or more or fewer users from which the content items are selected.

Additionally, the bundled event memory 522 may optionally include a bundled event memory soundtrack 802, which is an audio track that is played along with the visual aspect of the bundled event memory 522. As described earlier herein, the bundled event memory soundtrack 802 may be one or more audio recordings that are user-submitted content items. Alternatively, the bundled event memory soundtrack 802 may be comprised partially or completely of other audio that is not user-submitted content. In an embodiment of the invention, the bundled event memory soundtrack 802 is audio that is selected by the user generating the bundled event memory.

Figure 9:
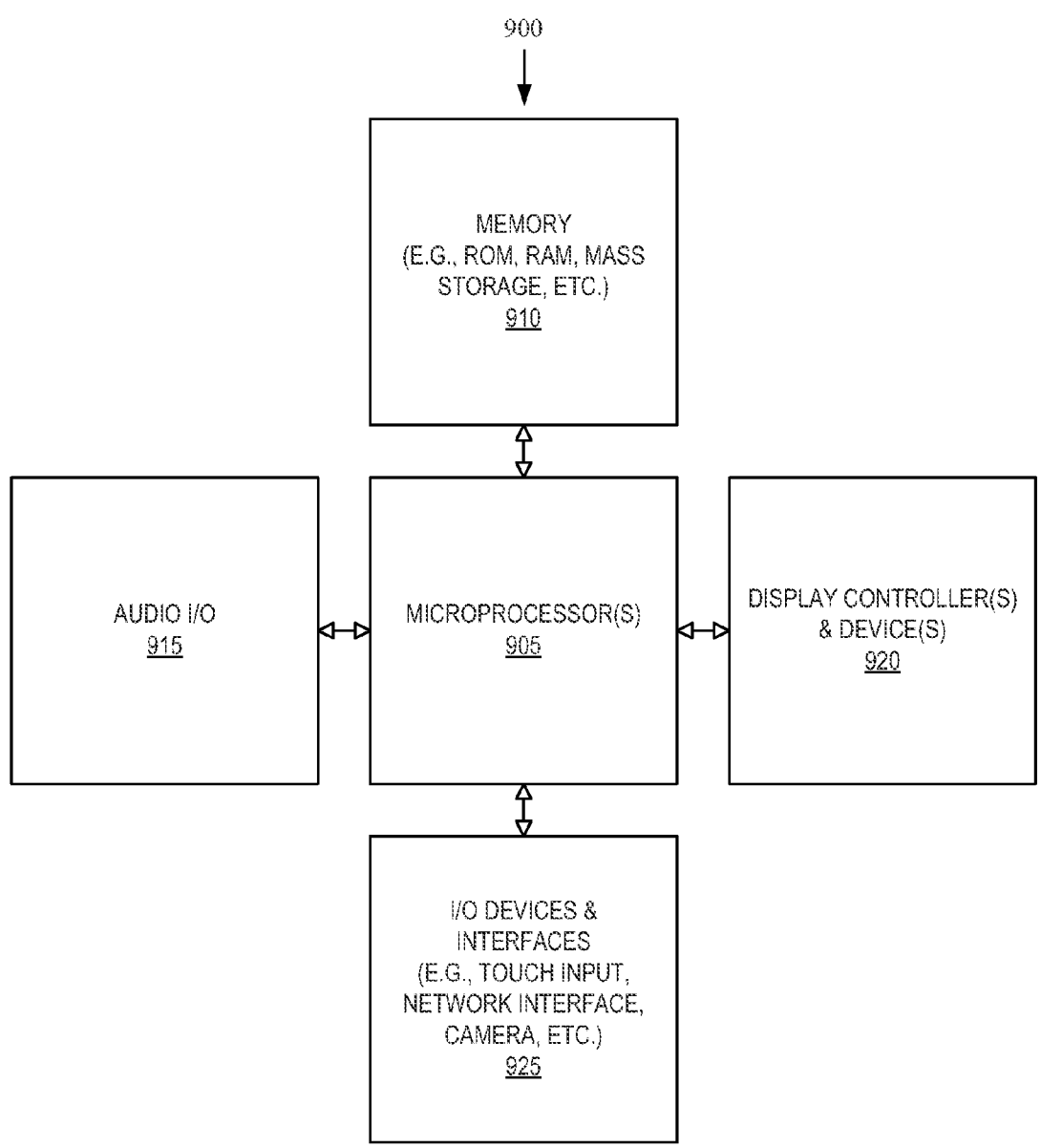
FIG. 9 illustrates, in block diagram form, an exemplary processing system to provide social competition functionalities.

FIG. 9 illustrates, in block diagram form, an exemplary processing system 900 to provide social competition functionalities. Data processing system 900 includes one or more microprocessors 905 and connected system components (e.g., multiple connected chips). Alternatively, the data processing system 900 is a system on a chip.

The data processing system 900 includes memory 910, which is coupled to the microprocessor(s) 905. The memory 910 may be used for storing data, metadata, and programs for execution by the microprocessor(s) 905. The memory 910 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 910 may be internal or distributed memory.

The data processing system 900 also includes an audio input/output subsystem 915 which may include a microphone and/or a speaker for, for example, playing back music or other audio, receiving voice instructions to be executed by the microprocessor(s) 905, playing audio notifications, etc.

A display controller and display device 920 provides a visual user interface for the user, e.g., GUI windows illustrated in FIGS. 5-8.

The data processing system 900 also includes one or more input or output ("I/O") devices and interfaces 925, which are provided to allow a user to provide input to, receive output from, and otherwise transfer data to and from the system. These I/O devices 925 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 900.

The I/O devices and interfaces 925 may also include a connector for a dock or a connector for a USB interface, FireWire, Thunderbolt, Ethernet, etc. to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc.

It will be appreciated that one or more buses may be used to interconnect the various components shown in FIG. 9.

The data processing system 900 is an exemplary representation of a user device 110, but any of these features may also be utilized by devices implementing the social networking system 130. The data processing system 900 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 900 may be a network computer, server, or an embedded processing device within another device or consumer electronic product. As used herein, the terms computer, system, device, processing device, and "apparatus comprising a processing device" may be used interchangeably with the data processing system 900 and include the above-listed exemplary embodiments.

It will be appreciated that additional components, not shown, may also be part of the system 900, and, in certain embodiments, fewer components than that shown in FIG. 9 may also be used in a data processing system 900. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 910 or other non-transitory machine-readable storage medium. The software may further be transmitted or received over a network (not shown) via a network interface device 925. In various embodiments, hardwired circuitry may be used in combination with the software instructions to implement the present embodiments. Thus, the techniques are not limited to any specific combination of hardware circuitry and software, or to any particular source for the instructions executed by the data processing system 900.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:
   receiving, from a first user device associated with a first user, a plurality of user identifiers for a plurality of users of a social networking system;
   identifying a first plurality of user-submitted content items available to the social networking system that are related to an event involving at least one user of the plurality of users, wherein the identifying of the first plurality of user-submitted content items includes:
   using the plurality of user identifiers to identify a second plurality of user-submitted content items posted to the social networking system by the plurality of users within a time range, analyzing the second plurality of user-submitted content items including metadata, content, and users identified within the content of each of the second plurality of user-submitted content items, generating a plurality of candidate content items, wherein the plurality of candidate content items is a subset of the second plurality of user-submitted content items, presenting to the first user device, the plurality of candidate content items wherein the plurality of candidate content items are displayed to the first user, receiving, from the first user device, a message indicating which of the plurality of candidate content items are to be included in the first plurality of user-submitted content items, and selecting two or more of the plurality of candidate content items as the first plurality of user-submitted content items based upon the message received from the first user device;

aggregating the first plurality of user-submitted content items into a bundled event memory, wherein the bundled event memory is a set of one or more files capable of being presented to users on user devices; and transmitting the bundled event memory to at least one of a plurality of user devices to be presented to at least some of the plurality of users, wherein the plurality of users use the plurality of user devices to communicate with the social networking system.

2. The method of claim 1, wherein the identifying of the first plurality of user-submitted content items comprises:

receiving a first time value and a second time value from the first user device, wherein the first time value indicates a beginning time of the event, and wherein the second time value indicates an ending time of the event.

3. The method of claim 2, wherein the time range indicates a period of time between the first time value and the second time value.

4. The method of claim 1, wherein receiving the plurality of user identifiers comprises:

identifying a third plurality of user-submitted content items posted to the social networking system during the time range; and identifying the plurality of users based upon the first plurality of user-submitted content items.

5. The method of claim 4, wherein the plurality of candidate content items include some of the second plurality of user-submitted content items and some of the third plurality of user-submitted content items.

6. The method of claim 1, wherein the first plurality of user-submitted content items includes at least two content types of the following set of content types: a photograph, a video, an audio recording, a comment about a post, and a post.

7. The method of claim 1, wherein the bundled event memory is a video montage including the first plurality of user-submitted content items.

8. A system comprising:

a processing device;

and a memory coupled to the processing device, the memory storing instructions which, when executed by the processing device, cause the system to:

receive, from a first user device associated with a first user, a plurality of user identifiers for a plurality of users of a networking system;

identify a first plurality of user-submitted content items available to the social networking system that are related to an event involving at least one user of a plurality of users of the plurality of users, wherein the identifying of the first plurality of user-submitted content items includes:

using the plurality of user identifiers to identify a second plurality of user-submitted content items posted to the social networking system by the plurality of users within a time range, analyzing the second plurality of user-submitted content items including metadata, content, and users identified within the content of each of the second plurality of user-submitted content items, generating a plurality of candidate content items, wherein the plurality of candidate content items is a subset of the second plurality of user-submitted content items, presenting to the first user device, the plurality of candidate content items wherein the plurality of candidate content items are displayed to the first user, receiving, from the first user device, a message indicating which of the plurality of candidate content items are to be included in the first plurality of user-submitted content items, and selecting two or more of the plurality of candidate content items as the first plurality of user-submitted content items based upon the message received from the first user device;

aggregate the first plurality of user-submitted content items into a bundled event memory, wherein the bundled event memory is a set of one or more files capable of being presented to users on user devices; and transmit the bundled event memory to at least some of a plurality of user devices to be presented to at least some of the plurality of users, wherein the plurality of users use the plurality of user devices to communicate with the social networking system.

9. The system of claim 8, wherein executing the instructions further causes the system to:

receive a first time value and a second time value from the first user device, wherein the first time value indicates a beginning time of the event, and wherein the second time value indicates an ending time of the event.

10. The system of claim 9, wherein the time range indicates a period of time between the first time value and the second time value.

11. The system of claim 8, wherein the receiving the plurality of user identifiers comprises:

identify a third plurality of user-submitted content items posted to the social networking system during the time range; and identify the plurality of users based upon the first plurality of user-submitted content items.

12. The system of claim 8, wherein the plurality of candidate content items include some of the second plurality of user-submitted content items and some of the third plurality of user-submitted content items.

13. The system of claim 8, wherein the first plurality of user-submitted content items includes at least two content types of the following set of content types: a photograph, a video, an audio recording, a comment about a post, and a post.

14. The system of claim 8, wherein the bundled event memory is a video montage including the first plurality of user-submitted content items.

15. A non-transitory computer-readable storage medium that provides instructions that, when executed by a processing device, will cause the processing device to perform operations comprising:

receiving, from a first user device associated with a first user, a plurality of user identifiers for a plurality of users of a networking system;

identifying a first plurality of user-submitted content items posted to the social networking system that are related to an event involving at least one user of the plurality of users, wherein the identifying of the first plurality of user-submitted content items includes:

using the plurality of user identifiers to identify a second plurality of user-submitted content items posted to the social networking system by the plurality of users within a time range, analyzing the second plurality of user-submitted content items including metadata, content, and users identified within the content of each of the second plurality of user-submitted content items, generating a plurality of candidate content items, wherein the plurality of candidate content items is a subset of the second plurality of user-submitted content items, presenting to the first user device, the plurality of candidate content items wherein the plurality of candidate content items are displayed to the first user, receiving, from the first user device, a message indicating which of the plurality of candidate content items are to be included in the first plurality of user-submitted content items, and selecting two or more of the plurality of candidate content items as the first plurality of user-submitted content items based upon the message received from the first user device;

aggregating the first plurality of user-submitted content items into a bundled event memory, wherein the bundled event memory is a set of one or more files capable of being presented to users on user devices; and transmitting the bundled event memory to at least some of a plurality of user devices to be presented to at least some of the plurality of users, wherein the plurality of users use the plurality of user devices to communicate with the social networking system.

16. The non-transitory computer-readable storage medium of claim 15, wherein the identifying of the first plurality of user-submitted content items comprises:

receiving a first time value and a second time value from the first user device, wherein the first time value indicates a beginning time of the event, and wherein the second time value indicates an ending time of the event.

17. The non-transitory computer-readable storage medium of claim 16, wherein the time range indicates a period of time between the first time value and the second time value.

18. The non-transitory computer-readable storage medium of claim 15, wherein receiving the plurality of user identifiers comprises:

identifying a third plurality of user-submitted content items posted to the social networking system during the time range; and identifying the plurality of users based upon the first plurality of user-submitted content items.

19. The non-transitory computer-readable storage medium of claim 18, wherein the plurality of candidate content items include some of the second plurality of user-submitted content items and some of the third plurality of user-submitted content items.

20. The non-transitory computer-readable storage medium of claim 15, wherein the first plurality of user-submitted content items includes at least two content types of the following set of content types: a photograph, a video, an audio recording, a comment about a post, and a post.

21. The non-transitory computer-readable storage medium of claim 15, wherein the bundled event memory is a video montage including the first plurality of user-submitted content items.

* * * * *